(12) United States Patent
Krumanaker et al.

(10) Patent No.: US 11,021,969 B2
(45) Date of Patent: *Jun. 1, 2021

(54) TURBINE BLADE

(71) Applicant: General Electric Company, Schenectady, NY (US)

(72) Inventors: Matthew Lee Krumanaker, Blue Ash, OH (US); Weston Nolan Dooley, West Chester, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/214,411

(22) Filed: Dec. 10, 2018

(65) Prior Publication Data

US 2020/0024969 A1 Jan. 23, 2020

Related U.S. Application Data

(63) Continuation of application No. 14/884,075, filed on Oct. 15, 2015, now Pat. No. 10,174,620.

(51) Int. Cl.
*F01D 5/18* (2006.01)
*F01D 9/04* (2006.01)
*F01D 25/12* (2006.01)

(52) U.S. Cl.
CPC ............ *F01D 5/187* (2013.01); *F01D 9/041* (2013.01); *F01D 25/12* (2013.01);
(Continued)

(58) Field of Classification Search
CPC . F01D 5/147; F01D 5/18; F01D 5/186; F01D 5/187; F01D 5/188; F01D 5/189;
(Continued)

(56) References Cited

U.S. PATENT DOCUMENTS 3,864,058 A 2/1975 Womack
4,416,585 A 11/1983 Abdel-Messeh
(Continued)

FOREIGN PATENT DOCUMENTS

EP 0227577 A2 7/1987
EP 0340149 A1 11/1989
(Continued)

OTHER PUBLICATIONS

A European Search Report and Written Opinion issued in connection with related European Application No. 16193545.7 dated Feb. 15, 2017.
(Continued)

*Primary Examiner* — Courtney D Heinle
*Assistant Examiner* — Sang K Kim
(74) *Attorney, Agent, or Firm* — McGarry Bair PC

(57) ABSTRACT

An airfoil comprises one or more internal cooling circuits. The cooling circuit can further comprise a near wall cooling mesh, fluidly coupling a supply passage to a mesh plenum. The mesh plenum can be disposed adjacent to the external surface of the airfoil having a plurality of film holes extending between the mesh plenum and the external surface of the airfoil. The mesh plenum can further comprise a cross-sectional area sized to facilitate machining of the film holes without damage to the interior of the airfoil.

20 Claims, 6 Drawing Sheets

(52) U.S. Cl.
CPC ...... *F05D 2220/32* (2013.01); *F05D 2240/12* (2013.01); *F05D 2240/30* (2013.01); *F05D 2260/202* (2013.01); *F05D 2260/204* (2013.01); *Y02T 50/60* (2013.01)

(58) Field of Classification Search
CPC ................. F01D 25/12; F05D 2260/20; F05D 2260/203; F05D 2260/204; F05D 2260/2212; F05D 2260/22141; F05D 2260/941
See application file for complete search history.

(56) References Cited

U.S. PATENT DOCUMENTS

| | | |
|---|---|---|
| 4,542,867 A | 9/1985 | Memmen |
| 4,669,957 A | 6/1987 | Phillips et al. |
| 4,992,025 A | 2/1991 | Stroud et al. |
| 5,062,768 A | 11/1991 | Marriage |
| 5,156,526 A | 10/1992 | Lee et al. |
| 5,165,852 A | 11/1992 | Lee et al. |
| 5,193,975 A | 3/1993 | Bird et al. |
| 5,223,320 A | 6/1993 | Richardson |
| 5,356,265 A | 10/1994 | Kercher |
| 5,370,499 A | 12/1994 | Lee |
| 5,383,766 A * | 1/1995 | Przirembel ............ F01D 5/186 416/92 |
| 5,392,515 A | 2/1995 | Auxier et al. |
| 5,405,242 A | 4/1995 | Auxier et al. |
| 5,498,273 A | 3/1996 | Mann |
| 5,538,394 A | 7/1996 | Nomata et al. |
| 5,558,496 A | 9/1996 | Woodmansee et al. |
| 5,660,524 A | 8/1997 | Lee et al. |
| 5,660,525 A | 8/1997 | Lee et al. |
| 5,690,472 A | 11/1997 | Lee |
| 5,690,473 A | 11/1997 | Kercher |
| 5,700,131 A | 12/1997 | Hall et al. |
| 5,827,043 A | 10/1998 | Fukuda et al. |
| 5,857,833 A | 1/1999 | Dev |
| 5,931,638 A | 8/1999 | Krause et al. |
| 6,033,181 A | 3/2000 | Endres et al. |
| 6,039,537 A | 3/2000 | Scheurlen |
| 6,164,912 A | 12/2000 | Tabbita et al. |
| 6,164,913 A | 12/2000 | Reddy |
| 6,234,755 B1 | 5/2001 | Bunker et al. |
| 6,238,183 B1 | 5/2001 | Williamson et al. |
| 6,254,334 B1 | 7/2001 | LaFleur |
| 6,257,831 B1 | 7/2001 | Papple et al. |
| 6,261,053 B1 | 7/2001 | Anderson et al. |
| 6,264,428 B1 | 7/2001 | Dailey et al. |
| 6,318,960 B1 | 11/2001 | Kuwabara et al. |
| 6,318,963 B1 | 11/2001 | Emery et al. |
| 6,368,060 B1 | 4/2002 | Fehrenbach et al. |
| 6,402,470 B1 | 6/2002 | Kvasnak et al. |
| 6,413,044 B1 | 7/2002 | Roeloffs et al. |
| 6,514,042 B2 | 2/2003 | Kvasnak et al. |
| 6,832,889 B1 | 12/2004 | Lee et al. |
| 6,840,737 B2 | 1/2005 | Flatman |
| 6,890,154 B2 | 5/2005 | Cunha |
| 6,896,487 B2 | 5/2005 | Cunha et al. |
| 6,910,370 B2 | 6/2005 | Clark et al. |
| 6,955,522 B2 | 10/2005 | Cunha et al. |
| 6,955,525 B2 | 10/2005 | Liang |
| 6,969,230 B2 | 11/2005 | Shi et al. |
| 6,969,237 B2 | 11/2005 | Hudson |
| 6,974,308 B2 | 12/2005 | Halfmann et al. |
| 6,981,846 B2 | 1/2006 | Liang |
| 6,984,102 B2 | 1/2006 | Bunker et al. |
| 7,080,972 B2 | 7/2006 | Rawlinson |
| 7,097,425 B2 | 8/2006 | Cunha et al. |
| 7,128,533 B2 | 10/2006 | Liang |
| 7,137,777 B2 | 11/2006 | Fried et al. |
| 7,186,084 B2 | 3/2007 | Bunker et al. |
| 7,244,101 B2 | 7/2007 | Lee et al. |
| 7,296,973 B2 | 11/2007 | Lee et al. |
| 7,300,250 B2 | 11/2007 | Papple |
| 7,311,497 B2 | 12/2007 | Sharma et al. |
| 7,311,498 B2 | 12/2007 | Cunha et al. |
| 7,478,994 B2 | 1/2009 | Cunha et al. |
| 7,540,712 B1 | 6/2009 | Liang |
| 7,563,073 B1 | 7/2009 | Liang |
| 7,572,102 B1 | 8/2009 | Liang |
| 7,607,890 B2 | 10/2009 | Cunha et al. |
| 7,621,719 B2 | 11/2009 | Lutjen et al. |
| 7,625,178 B2 | 12/2009 | Morris et al. |
| 7,625,179 B2 | 12/2009 | Cunha et al. |
| 7,645,122 B1 | 1/2010 | Liang |
| 7,665,965 B1 | 2/2010 | Liang |
| 7,690,893 B2 | 4/2010 | Cunha |
| 7,722,325 B2 | 5/2010 | Cunha |
| 7,775,053 B2 | 8/2010 | Joe et al. |
| 7,841,828 B2 | 11/2010 | Liang |
| 7,901,183 B1 | 3/2011 | Liang |
| 7,921,654 B1 | 4/2011 | Liang |
| 7,934,906 B2 | 5/2011 | Gu et al. |
| 7,955,053 B1 | 6/2011 | Liang |
| 7,980,819 B2 | 7/2011 | Albert et al. |
| 8,057,182 B2 | 11/2011 | Brittingham et al. |
| 8,079,810 B2 | 12/2011 | Liang |
| 8,092,145 B2 | 1/2012 | Martel et al. |
| 8,092,175 B2 | 1/2012 | Beeck et al. |
| 8,105,033 B2 | 1/2012 | Hudson |
| 8,142,153 B1 | 3/2012 | Liang |
| 8,177,506 B2 | 5/2012 | Cunha et al. |
| 8,231,330 B1 | 7/2012 | Liang |
| 8,292,582 B1 | 10/2012 | Liang |
| 8,527,543 B1 | 9/2013 | Weil et al. |
| 8,628,298 B1 | 1/2014 | Liang |
| 8,764,394 B2 | 7/2014 | Lee et al. |
| 9,297,267 B2 * | 3/2016 | Itzel .................... F01D 5/187 |
| 10,174,620 B2 * | 1/2019 | Krumanaker .......... F01D 5/187 |
| 2004/0221720 A1 | 11/2004 | Anderson et al. |
| 2005/0111977 A1 | 5/2005 | Lee et al. |
| 2005/0118024 A1 | 6/2005 | Anguisola McFeat et al. |
| 2005/0129508 A1 | 6/2005 | Fried et al. |
| 2005/0169752 A1 | 8/2005 | Lee et al. |
| 2005/0214118 A1 | 9/2005 | Dodd |
| 2005/0232769 A1 | 10/2005 | Lee et al. |
| 2006/0034690 A1 | 2/2006 | Papple et al. |
| 2006/0073015 A1 | 4/2006 | Liang |
| 2006/0093480 A1 | 5/2006 | Cunha et al. |
| 2006/0133923 A1 | 6/2006 | Paauwe et al. |
| 2006/0275118 A1 | 12/2006 | Lee |
| 2007/0048122 A1 | 3/2007 | Van Suetendael, IV et al. |
| 2007/0140848 A1 | 6/2007 | Charbonneau et al. |
| 2008/0041064 A1 | 2/2008 | Moore et al. |
| 2009/0060715 A1 | 3/2009 | Kopmels |
| 2009/0081024 A1 | 3/2009 | Tibbott |
| 2009/0214329 A1 | 8/2009 | Joe et al. |
| 2009/0255230 A1 | 10/2009 | Mildner |
| 2010/0021308 A1 | 1/2010 | Rawlinson |
| 2010/0040480 A1 | 2/2010 | Webster et al. |
| 2010/0119377 A1 | 5/2010 | Tibbott et al. |
| 2010/0172762 A1 | 7/2010 | Rawlinson |
| 2010/0239409 A1 | 9/2010 | Draper |
| 2010/0247321 A1 | 9/2010 | Kulkarni et al. |
| 2010/0254801 A1 | 10/2010 | Tibbott |
| 2011/0067378 A1 | 3/2011 | Tibbott et al. |
| 2011/0067409 A1 | 3/2011 | Beeck |
| 2011/0236188 A1 | 9/2011 | Knapp et al. |
| 2011/0247345 A1 | 10/2011 | Laurello et al. |
| 2011/0247347 A1 | 10/2011 | Ebert et al. |
| 2012/0070308 A1 | 3/2012 | Naik et al. |
| 2012/0269648 A1* | 10/2012 | Lee ...................... F01D 5/187 416/97 R |
| 2014/0031275 A1 | 1/2014 | Lewis et al. |
| 2014/0033736 A1 | 2/2014 | Propheter-Hinckley et al. |
| 2016/0333702 A1* | 11/2016 | Slavens .................. F01D 25/12 |
| 2017/0107824 A1 | 4/2017 | Krumanaker et al. |
| 2017/0107825 A1 | 4/2017 | Krumanaker et al. |
| 2017/0107827 A1 | 4/2017 | Krumanaker et al. |

(56) References Cited

U.S. PATENT DOCUMENTS

2017/0107828 A1 4/2017 Krumanaker et al.
2017/0107829 A1 4/2017 Krumanaker et al.

FOREIGN PATENT DOCUMENTS

| EP | 0690202 A2 | 1/1996 |
|----|------------|--------|
| EP | 0924408 A2 | 6/1999 |
| EP | 1267037 A2 | 12/2002 |
| EP | 1630354 A2 | 3/2006 |
| EP | 2835501 A1 | 2/2015 |
| EP | 3124746 A1 | 2/2017 |
| WO | 2014031275 A1 | 2/2014 |
| WO | 2014055259 A1 | 4/2014 |
| WO | 2015123006 A1 | 8/2015 |

OTHER PUBLICATIONS

A European Search Report and Written Opinion issued in connection with related European Application No. 16193546.5 dated Feb. 15, 2017.

A European Search Report and Written Opinion issued in connection with related European Application No. 16191836.2 dated Feb. 22, 2017.

A European Search Report and Written Opinion issued in connection with corresponding European Application No. 16193559.8 dated Mar. 1, 2017.

Walsh et al., "Effects of Sand Ingestion on the Blockage of Film-Cooling Holes", ASME Proceedings: Heat Transfer, Barcelona, Spain, vol. No. 3, May 8-11, pp. 81-90, 2006.

Musgrove et al., "Computational Design of a Louver Particle Separator for Gas Turbine Engines", ASME Proceedings: Heat Transfer, Power for Land, Sea and Air, Orlando, Florida, pp. 1313-1323, Jun. 8-12, 2009.

Cardweli et al., "Investigation of Sand Blocking Within Impingement and Film-Cooling Holes", Journal of Turbomachinery, vol. No. 132, Issue No. 2, 10 pages, Jan. 21, 2010.

Lawson et al., "Simulations of Multi-Phase Particle Deposition on Endwall Film-Cooling Holes in Transverse Trenches", ASME Proceedings: Heat Transfer, vol. No. 5, pp. 79-90, Jun. 6-10, 2011.

Lawson et al., "Simulations of Multi-Phase Particle Deposition on a Showerhead With Staggered Film-Cooling Holes", ASME Proceedings: Heat Transfer, vol. No. 5, pp. 91-103, Jun. 6-10, 2011.

\* cited by examiner

TURBINE BLADE

CROSS-REFERENCE TO RELATED APPLICATION

This application is a continuation of U.S. application Ser. No. 14/884,075, filed on Oct. 15, 2015, titled "TURBINE BLADE", which is hereby expressly incorporated herein by reference in its entirety.

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

An airfoil having an outer surface defining a pressure side and a suction side extending axially between a leading edge and a trailing edge and extending radially between a root and a tip. The airfoil further comprises a cooling circuit located within the airfoil further comprising a radially extending supply passage fluidly coupled to the cooling air inlet passage, a near wall cooling mesh located adjacent to and extending along a portion of the outer surface, a radially extending opening fluidly coupling the supply passage to the near wall cooling mesh to define a fluid inlet for the near wall cooling mesh, and a plenum fluidly coupled to the near wall cooling mesh to define a fluid outlet for the near wall cooling mesh, wherein cooling air flows through the near wall cooling mesh from the inlet to the outlet and the cross-sectional area of the plenum is greater than the cross-sectional area of the cooling mesh in the flow direction.

A blade for a gas turbine engine having a turbine rotor disk. The blade comprises a dovetail having multiple air inlet passages and configured to mount to the turbine rotor disk. The blade further comprises an airfoil extending radially from the dovetail and having an outer surface defining a pressure side and a suction side extending axially between the leading edge and a trailing edge and extending radially between a root and a tip, with the root being adjacent the dovetail. The blade further comprises a leading edge cooling circuit located within the airfoil and fluidly coupled to a corresponding one of the multiple air inlet passages, a trailing edge cooling circuit located within the airfoil and fluidly coupled to a corresponding one of the multiple air inlet passages, and a mid cooling circuit located within the airfoil and between the leading edge cooling circuit and the trailing edge cooling circuit, the mid cooling circuit comprising: a radially extending supply passage fluidly coupled to the cooling air inlet passage, a near wall cooling mesh located adjacent to and extending along a portion of the outer surface, a radially extending opening fluidly coupling the supply passage to the near wall cooling mesh to define a fluid inlet for the near wall cooling mesh, and a plenum fluidly coupled to the near wall cooling mesh to define a fluid outlet for the near wall cooling mesh. The cooling air flows through the near wall cooling mesh from the inlet to the outlet and the cross-sectional area of het plenum is greater than the cross-sectional area of the cooling mesh in the flow direction.

An airfoil for a gas turbine engine having a peripheral wall bounding an interior and defining a pressure side and a suction side, opposite the pressure side, a near wall cooling mesh located adjacent to and extending along a portion of one of the suction side and the pressure side, and a plenum fluidly coupled to the near wall cooling mesh to define a fluid outlet for the near wall cooling mesh, wherein the plenum has a larger cross dimension in a chord-wise plan than the near wall cooling mesh.

DESCRIPTION OF EMBODIMENTS OF THE INVENTION

The described embodiments of the present invention are directed to a turbine blade, and in particular to cooling a turbine blade. For purposes of illustration, the present invention will be described with respect to a turbine blade for an aircraft gas turbine engine. It will be understood, however, that the invention is not so limited and can have general applicability in non-aircraft applications, such as other mobile applications and non-mobile industrial, commercial, and residential applications. It can also have application to airfoils, other than a blade, in a turbine engine, such as stationary vanes.

It should be appreciated that as described herein the term "span-wise" should be understood as the direction generally extending between a root and a tip of an airfoil. It should be further understood that as described herein, the term "chord-wise" should be understood as the direction generally extending arcuately between a leading edge and a trailing edge of an airfoil. Furthermore, "chord-wise" can define a "chord-wise plane" such that a planar area can be defined extending between the leading edge and the trailing edge.

Figure 1:
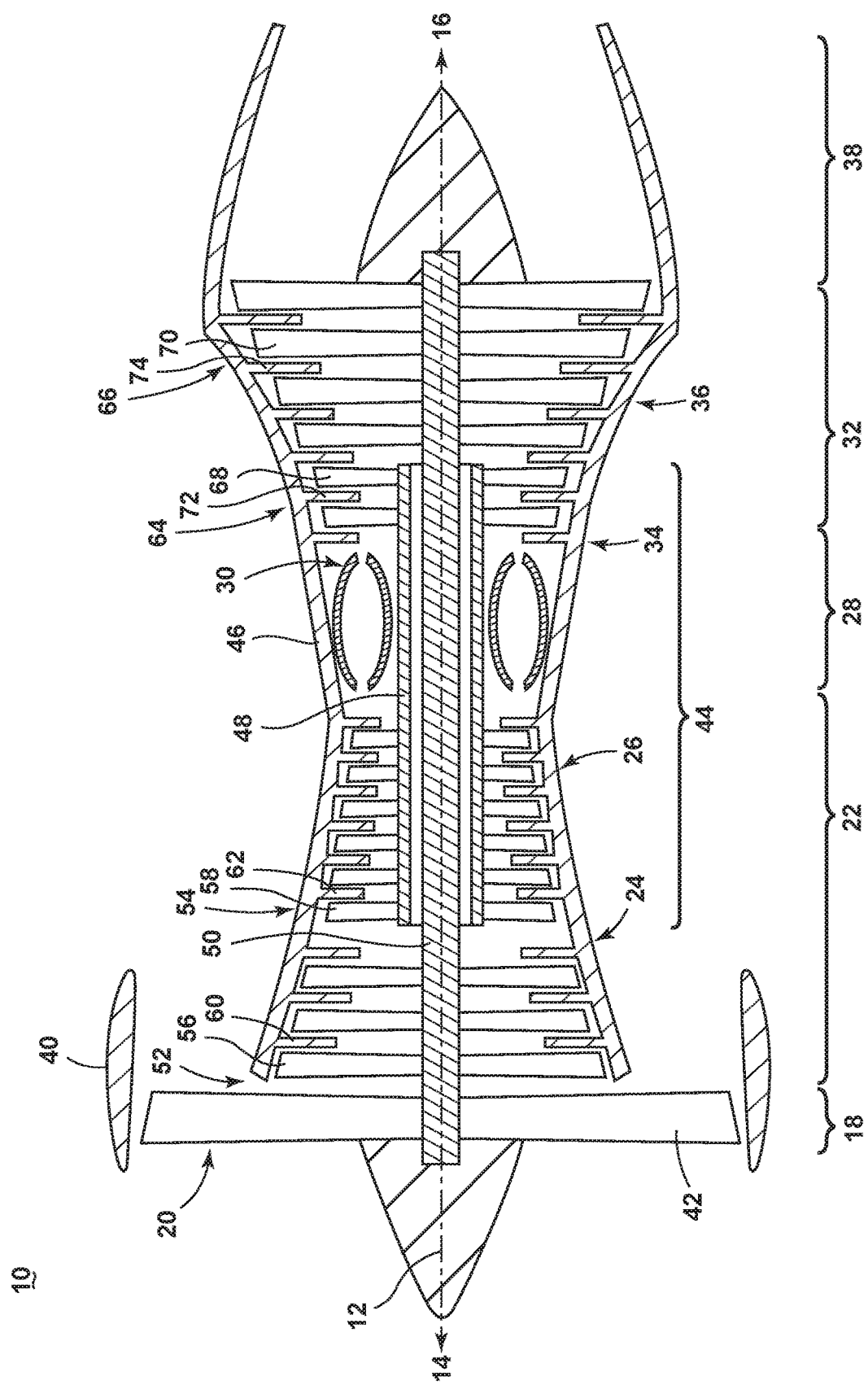
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of airfoils in the form of fan blades 42 disposed radially about the centerline 12. The HP compressor 26, the combustor 30, and the HP turbine 34 form a core 44 of the engine 10, which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of rotating airfoils in the form of compressor blades 56, 58 that rotate relative to a corresponding set of static airfoils in the form of compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set rotating airfoils in the form of turbine blades 68, 70 that are rotated relative to a corresponding set of static airfoils in the form of turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
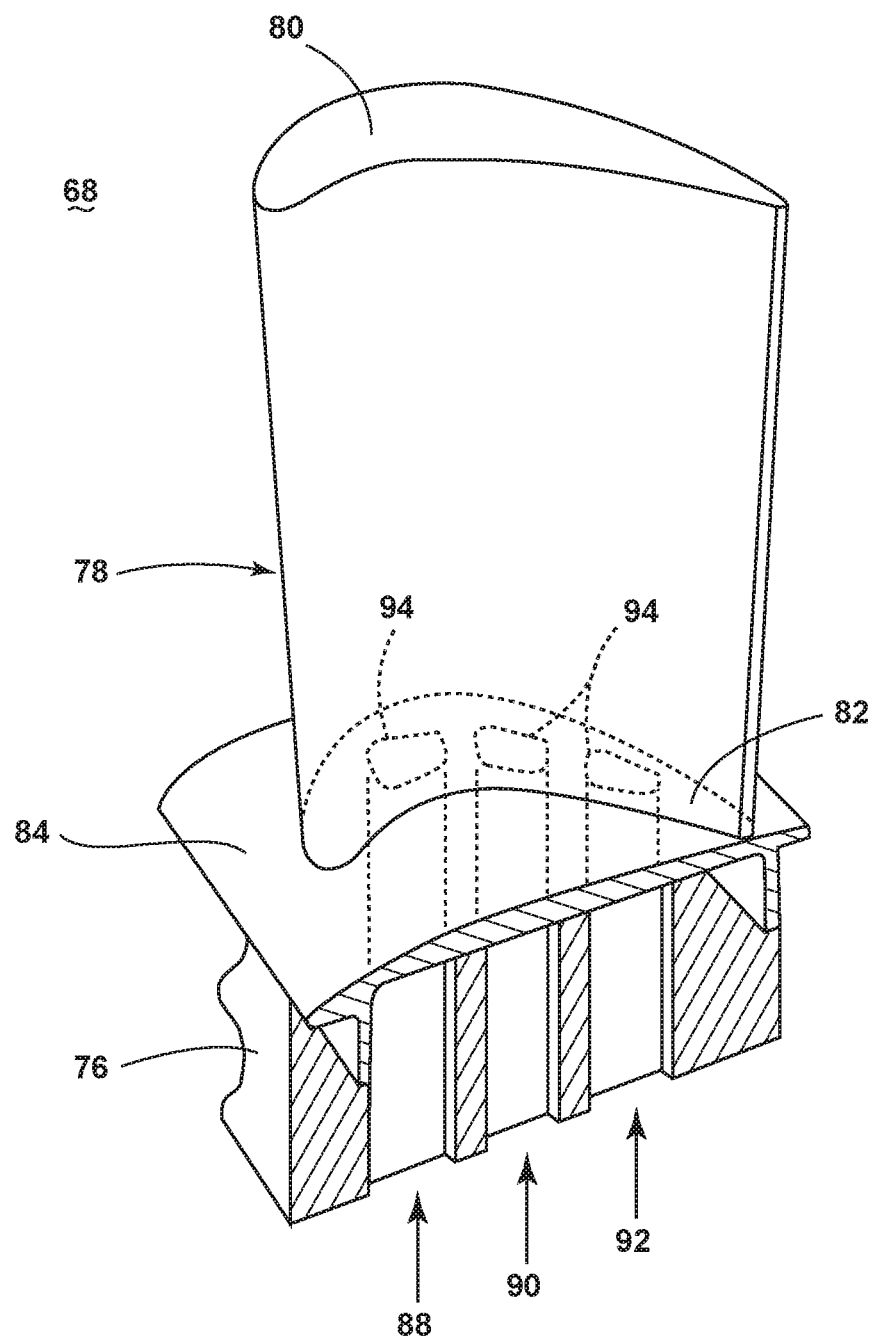
FIG. 2 is a perspective view of an engine component in the form of a turbine blade of the engine of FIG. 1 with cooling air inlet passages.

FIG. 2 is a perspective view of an engine component in the form of one of the turbine blades 68 of the engine 10 from FIG. 1. The turbine blade 68 includes a dovetail 76 and an airfoil 78. The airfoil 78 extends from a tip 80 to a root 82. The dovetail 76 further includes a platform 84, integral with the airfoil 78 at the root 82, which helps to radially contain the turbine air flow. The dovetail 76 can be configured to mount to a turbine rotor disk on the engine 10. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a passage outlet 94. It should be appreciated that the dovetail 76 is shown in cross-section, such that the inlet passages 88, 90, 92 are housed within the body of the dovetail 76.

Figure 3:
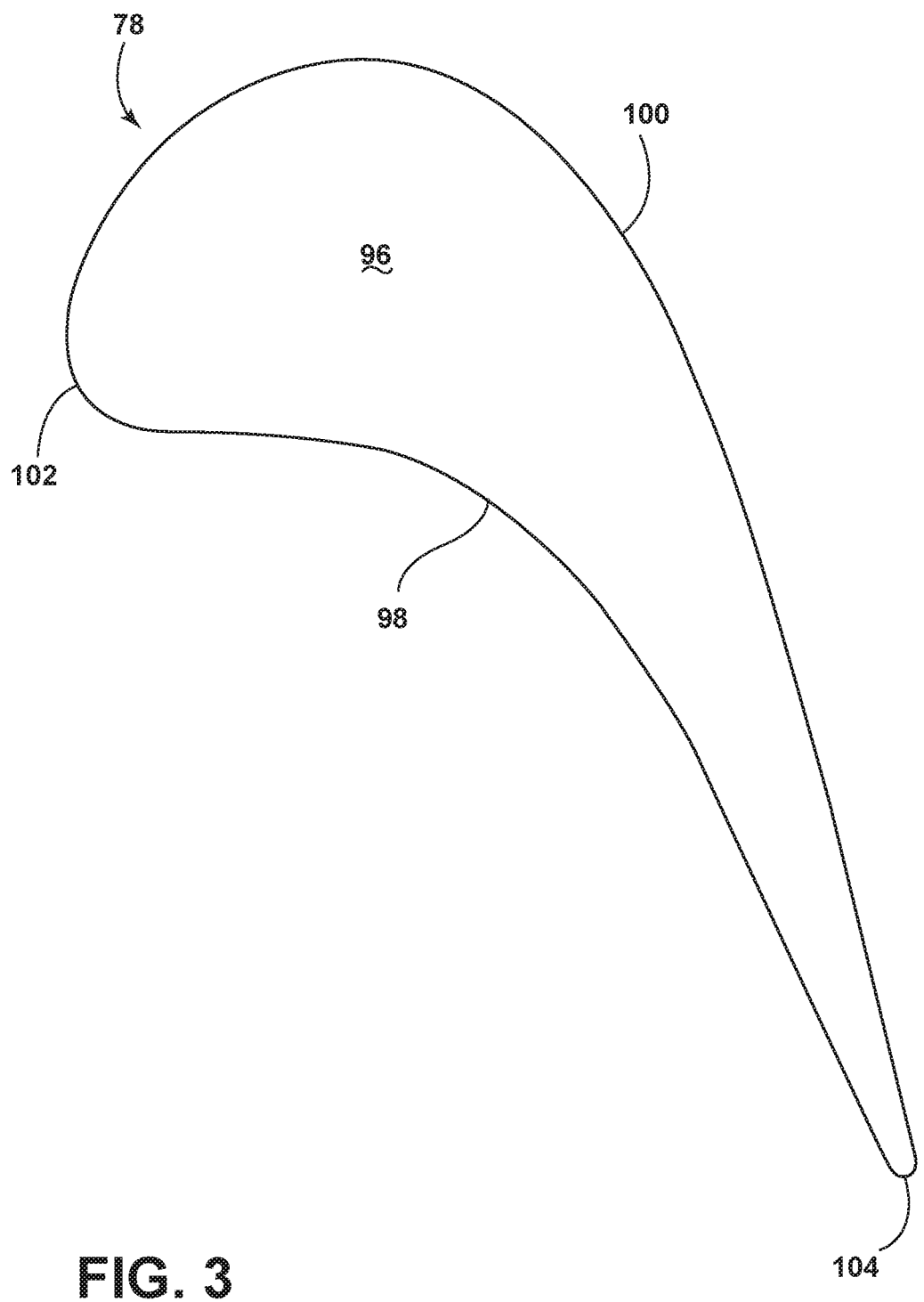
FIG. 3 is a cross-sectional view of the airfoil of FIG. 2.

Turning to FIG. 3, the airfoil 78, shown in cross-section, has an interior 96, defined by a concave-shaped pressure sidewall 98, defining a pressure side, and a convex-shaped suction sidewall 100, defining a suction side, which are joined together to define the airfoil shape with a leading edge 102 and a trailing edge 104. The airfoil 78 rotates in a direction such that the pressure sidewall 98 follows the suction sidewall 100. Thus, as shown in FIG. 3, the airfoil 78 would rotate upward toward the top of the page.

Figure 4:
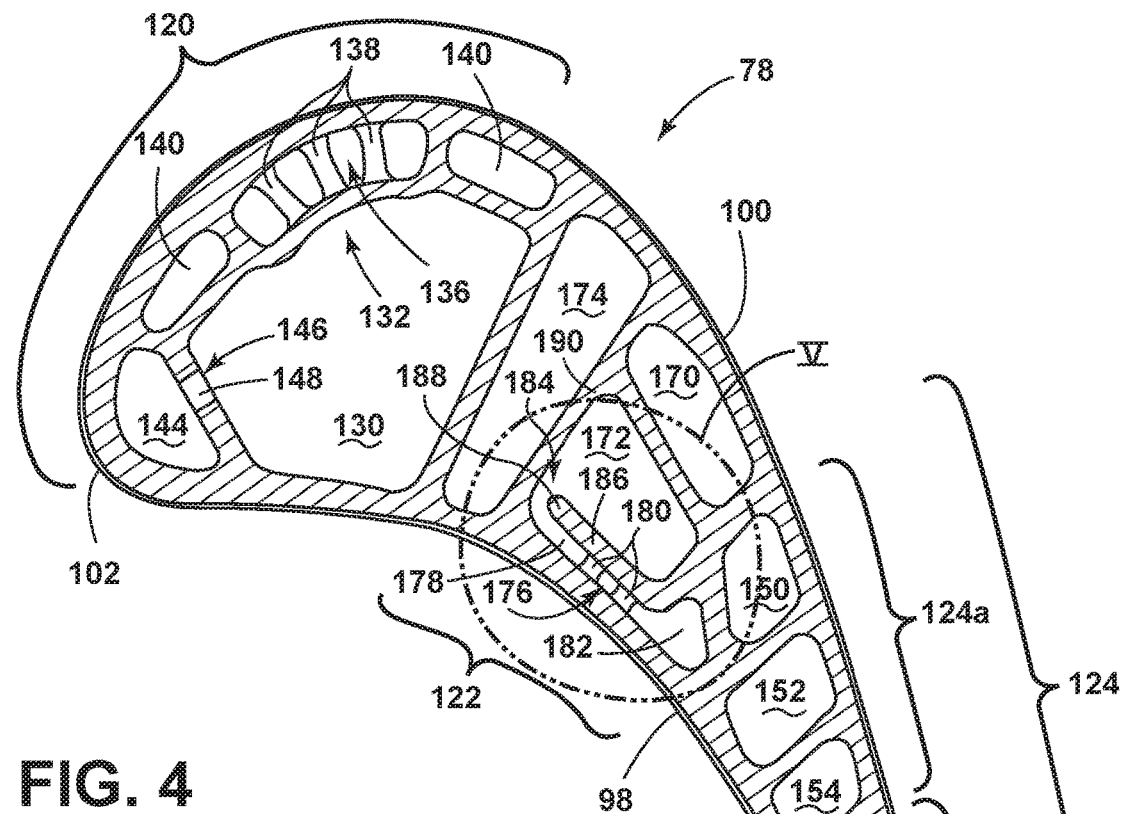
FIG. 4 is a diagram of the cross-sectional airfoil of FIG. 3 illustrating four cooling circuits.

The airfoil 78 comprises a plurality of internal passages which can be arranged to form cooling circuits dedicated to cool a particular portion of the blade 68. The passages and the corresponding cooling circuits are illustrated in FIG. 4, which is a cross-sectional view of the airfoil 78. It should be appreciated that the respective geometries of each individual passage within the airfoil 78 as shown is exemplary, each depicting one or more elements of a cooling circuit and should not limit the cooling circuits to the geometries, dimensions, or positions as shown.

As illustrated, the airfoil 78 is provided with three cooling circuits comprising a leading edge cooling circuit 120, a mid cooling circuit 122, and a trailing edge cooling circuit 124, which are supplied cooling air via the inlet passages 88, 90, 92, respectively. The trailing edge cooling circuit 124, as illustrated, further comprises a first cooling circuit 124a and a second cooling circuit 124b, commonly fed from the third cooling passage 92.

The cooling circuits can be defined by one or more passages extending radially within the airfoil 78. It should be appreciated that the passages can comprise one or more film holes which can provide fluid communication between the particular passage and the external surface of the airfoil 78, providing a film of cooling fluid along the external surface of the airfoil 78.

Looking in greater detail at each of the cooling circuits, the leading edge cooling circuit 120 can comprise a supply passage 130, near wall cooling circuit 132, and leading edge passage 144. The supply passage 130 extends from the root 82 toward the tip 80, being fluidly coupled to the first inlet passage 88 at the outlet 94 to supply the cooling air to the near wall cooling circuit 132 and leading edge passage 144.

The near wall cooling circuit 132 is exemplarily illustrated between the supply passage 130 and the suction sidewall 100, while being adjacent to the suction sidewall 100. In this configuration, the near wall cooling circuit 132 cools the wall portion of the airfoil 78 along the suction sidewall 100. Alternatively, the near wall cooling circuit 132 can be positioned adjacent to the pressure sidewall 98, between the pressure sidewall 98 and the supply passage 130. As such, the supply passage 130 can alternatively be positioned adjacent to the suction sidewall 100.

The near wall cooling circuit 132 comprises a plenum passage 136, extending from the tip 80 to the root 82, and can have a plurality of pins or pin banks 138 disposed within the plenum passage 136. The near wall cooling circuit 132 further comprises at least one return passage 140, illustrated in FIG. 4 as two return passages 140 located on opposite chord-wise ends of the plenum passage 136. The return passages 140 fluidly couple to the plenum passage 136 near the root 82, and extend from the root 82 to the tip 80.

The leading edge cooling circuit 120 further comprises a leading edge passage 144, being located adjacent to the leading edge 102 and extending from the root 82 to the tip 80. The leading edge passage 144 is in fluid communication with the supply passage 130 through a lead circuit channel 146 defined in a wall 148 between the supply passage 130 and the leading edge passage 144. The lead circuit channel 146 can comprise multiple discrete inlets, such as impingement openings. The leading edge passage 144 can further be adjacent to one return passage 140 of the near wall cooling circuit 132.

The trailing edge cooling circuit 124, comprising the first cooling circuit 124a and the second cooling circuit 124b, can be commonly fed from the third inlet passage 92. The third inlet passage 92 can feed both the first cooling circuit 124a and the second cooling circuit 124b where the third inlet passage 92 can split from one inlet into two distinct inlets within the dovetail 76. Alternatively, a fourth inlet passage (not shown) can be used to feed one of the first cooling circuit 124a or the second cooling circuit 124b while the third inlet passage 92 feeds the other. The second cooling circuit 124b is disposed adjacent to the trailing edge 104 and the first cooling circuit 124a is disposed chord-wise between the second cooling circuit 124b and the mid cooling circuit 122.

The first cooling circuit 124a comprises a supply passage 150, being in fluid communication with the third inlet passage 92, and extending from the root 82 to the tip 80. The supply passage 150 fluidly couples to a return passage 152 extending from the tip 80 to the root 82, which fluidly couples to an outlet passage 154 extending from the root 82 to the tip 80.

The second cooling circuit 124b comprises a supply passage 160, being in fluid communication with the third inlet passage 92 and extending from the root 82 to the tip 80. The supply passage 160 fluidly communicates with a trailing edge passage 162, extending from root 82 to tip 80. In one example, the trailing edge passage 162 can be coupled to the supply passage 160 through one or more inlets 164 extending radially along the airfoil 78, disposed between the supply and trailing edge passages 160, 162. The trailing edge passage 162 can be disposed with one or more rows of pins or pin banks 166 disposed within the trailing edge passage 162. The trailing edge passage 162 can further comprise one or more slots 168 in fluid communication with the trailing edge passage 162 and the exterior of the airfoil 78.

The mid cooling circuit 122 is disposed in the chord-wise middle of the airfoil 78 between the leading edge cooling circuit 120 and the trailing edge cooling circuit 124. The mid cooling circuit 122 can fluidly couple to the second inlet passage 90, receiving a flow of cooling fluid therefrom. The mid cooling circuit 122 comprises an upstream supply passage 160, fluidly coupled to the second inlet passage 90, extending from root 82 to tip 80. The upstream supply passage 160 can be located adjacent to the suction sidewall 100, or can be adjacent the pressure sidewall 98, or neither adjacent to the pressure nor suction sidewalls 98, 100.

The upstream supply passage 170 fluidly couples to a mid supply passage 172 extending from tip 80 to root 82. The mid supply passage 172 further couples to a mid return passage 174. A structural rib 190, spanning the interior 96 and extending between the pressure sidewall 98 and the suction sidewall 100, is disposed between the mid return passage 174 and the combination of the upstream supply passage 170 and the mid supply passage 172. The mid return passage 174 also can span the interior 96 between the pressure sidewall 98 and the suction sidewall 100. In addition to the mid return passage 174, the mid supply passage 172 further fluidly couples to a near wall cooling mesh 176 located adjacent to the pressure side between the pressure sidewall 98 and the mid supply passage 172.

It should be appreciated that the geometry as illustrated in FIG. 4 is exemplary of one implementation of the cooling circuits disclosed herein and should not be construed as limiting. The cooling circuits comprising a plurality of passages, walls, channels, pin banks, etc. should be understood as one exemplary implementation of the cooling circuits within an airfoil 78, and the positions, dimensions, and geometries disclosed herein are incorporated in order to facilitate understanding of the inventive concept of the cooling circuits. For example, the near wall cooling circuit 132, while shown on the suction sidewall 100 of the airfoil 78, can alternatively be located on the pressure sidewall 98. Additionally, the abstract shapes defined by the passages within the cross-sectional profile of the airfoil 78 are exemplary and can be any shape, being geometrical, unique, or otherwise.

Figure 5:
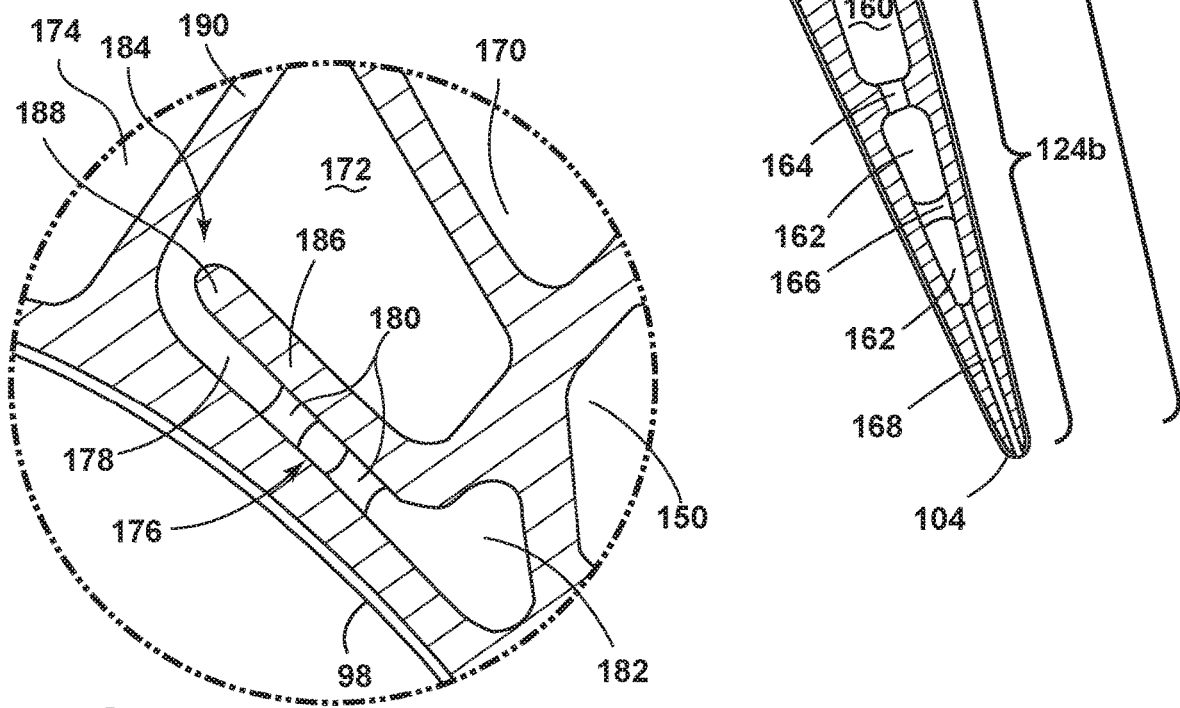
FIG. 5 is an enlarged view of a mid cooling circuit of FIG. 4 illustrating a near wall cooling mesh and plenum.

Looking at FIG. 5, best illustrating the mid cooling circuit 122, the near wall cooling mesh 176 fluidly communicates with the upstream supply passage 170 via the mid supply passage 172. The mid supply passage 172 is in fluid communication with the near wall cooling mesh 176 through a radially extending opening, defining a fluid inlet 184 for the near wall cooling mesh 176. A dividing wall 186 is disposed between the mid supply passage 172 and the near wall cooling mesh 176, partially defining the mid supply passage 172, the inlet 184, and the near wall cooling mesh 176. The dividing wall 186 terminates in a free end 188, adjacent to and partially defining the inlet 184, located opposite of the structural rib 190. The near wall cooling mesh 176 further comprises a channel 178 having a plurality of pins or a pin bank 180 disposed within the channel 178.

The channel 178 provides fluid communication between the mid supply passage 172 and a mesh plenum 182. The mesh plenum 182 defines a fluid outlet for the near wall cooling mesh 176. The mesh plenum 182 comprises a geometry defining a cross-sectional area for the mesh plenum 182 greater than the cross-sectional area of the near wall cooling mesh 176 in the flow direction. In alternative orientations for the mid cooling circuit 122, the near wall cooling mesh 176 can be located adjacent to the suction sidewall 100.

It should be appreciated that the cross-sectional area for the mesh plenum 182 is larger relative to the channel 178 facilitating machining of a plurality of film holes along the span-wise length of the mesh plenum 182. Typical drilling of film holes through the pressure or suction sidewalls 98, 100 can extend into and damage additional walls or passages within the interior 96 of the airfoil 78 if not provided with sufficient space for the drill to extend. The term "drill" as utilized herein refers to machining by some known method, for example laser or electro-discharge machining. The additional volume within the mesh plenum 182, resultant from the increased cross-sectional area, can also effect a kinder airflow within the mesh plenum 182, which can assist in establishing a uniform cooling film exhausted from the film holes.

Figure 6:
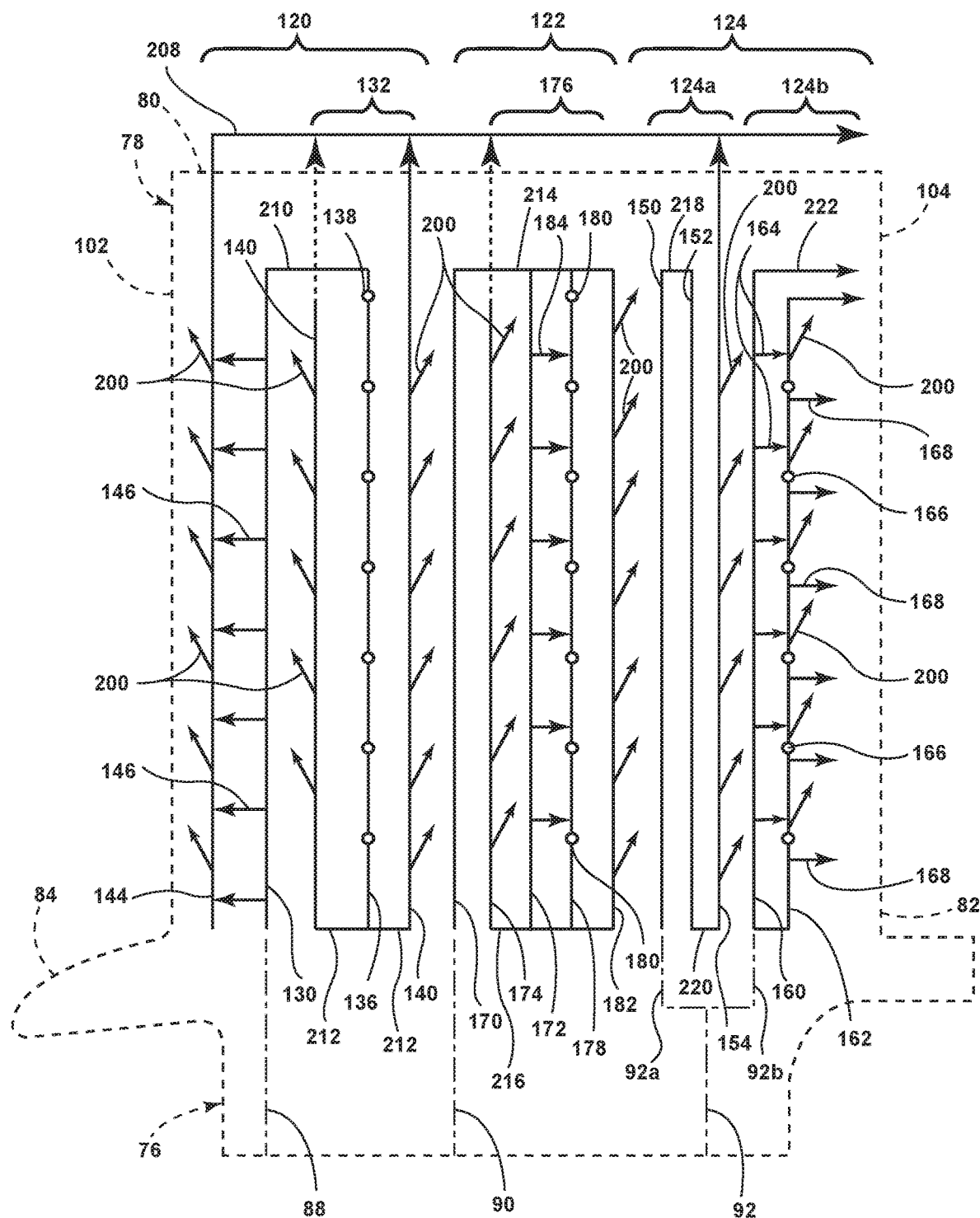
FIG. 6 is a flow diagram for the cooling circuits of FIG. 4.

FIG. 6 is a flow diagram for the cooling circuits 120, 122, 124 of the airfoil 78 of FIG. 4. The airfoil 78 is schematically shown in broken line to illustrate the general configuration of the cooling circuit 120, 122, 124 within the airfoil 78. The airfoil 78 defines the interior 96 as a cavity extending from the leading edge 102 to the trailing edge 104 in a chord-wise direction and from the tip 80 to the root 82 in a span-wise direction, and which can be divided into distinct channels or passages by internal walls to form the cooling circuits 120, 122, 124, which direct a flow of cooling fluid through the airfoil 78. A tip cooling passage 208, disposed above the tip 80 of the airfoil 78, can extend in a substantially chord-wise direction from adjacent the leading edge 102 toward the trailing edge 104. The tip cooling passage 208 provides a common passage for the cooling circuits 120, 122, 124 to exhaust a cooling fluid, such that cooling fluid fed into the cooling circuits 120, 122, 124 can be exhausted from the airfoil 78 if not being exhausted through one or more film holes.

The leading edge cooling circuit 120 can be fed with cooling fluid from the first inlet passage 88 within the dovetail 76. The leading edge cooling circuit 120 receives the cooling fluid within the supply passage 130 moving from the root 82 toward the tip 80. The supply passage 130 fluidly communicates with the leading edge passage 144 through the lead circuit channel 146 where a plurality of film holes 200 can exhaust the cooling fluid along the leading edge 102 of the airfoil 78 to create a cooling film.

The leading edge cooling circuit 120 can further include at least one upper turn 210 near the tip 80, providing cooling fluid to the near wall cooling circuit 132 from the supply passage 130. At the upper turn 210, the cooling fluid can flow from the supply passage 130 into plenum passage 136. The cooling fluid travels within the plenum passage 136, comprising multiple pins 138, in a tip 80 to root 82 direction. Near the root 82, the leading edge cooling circuit 120 can further comprise at least one lower turn 212, exemplarily illustrated as two lower turns 212, providing cooling fluid from the plenum passage 136 to the return passages 140. The cooling fluid flows within the return passages 140 in a root 82 to tip 80 direction, and can exhaust the cooling fluid through the film holes 200 to form a cooling film along the airfoil 78 exterior surface or move the cooling fluid toward the tip cooling passage 208.

The trailing edge cooling circuit 124 can be fed with a flow of cooling fluid from the third inlet passage 92. The third inlet passage 92, can further supply the first cooling circuit 124*a* and the second cooling circuit 124*b* individually, which can be done by separating the cooling fluid flow from the third inlet passage 92 into a leading side inlet 92*a* and a trailing side inlet 92*b*.

The first cooling circuit 124*a*, illustrated as being fed from the leading side inlet 92*a*, receives a cooling fluid flow within the supply passage 150 in a root 82 to tip 80 direction. At an upper turn 218, the cooling fluid can be provided to the return passage 152 from the supply passage 150, moving in a tip 80 to root 82 direction. The cooling fluid can then be provided to the outlet passage 154 from the return passage 152, at a lower turn 220 moving from root 82 to tip 80. Within the outlet passage 154, the cooling fluid can be exhausted through the film holes 200 to provide a cooling film along the exterior surface of the airfoil 78. Thus, the fluid path defined by the first cooling circuit 124*a* can be substantially serpentine, snaking between the tip 80 and the root 82.

The second cooling circuit 124*b*, illustrated as being fed from the trailing side inlet 92*b*, can be provided with a flow of cooling fluid in the supply passage 160 in a root 82 to tip 80 direction. Along the supply passage 160, cooling fluid can flow into a trailing edge passage 162, which can comprise one or more pins 166, through one or more inlets 164 from the supply passage 160. Cooling fluid, which does not flow into the trailing edge passage 162, can be exhausted from the tip end 222 of the supply passage out the trailing edge 104 of the airfoil 78. Cooling air within the trailing edge passage 162 can be exhausted from the airfoil 78 through the film holes 200, or can alternatively be exhausted through the trailing edge 104 through the slots 168.

The mid cooling circuit 122, disposed chord-wise between the leading edge cooling circuit 120 and the trailing edge cooling circuit 124, can be fed with a flow of cooling fluid from the second inlet passage 90. The mid cooling circuit 122 receives the cooling fluid within the upstream supply passage 170 from the second inlet passage 90, moving from the root 82 toward the tip 80. The mid cooling circuit 122 further comprises an upper turn 214 where the upstream supply passage 170 fluidly communicates with the mid supply passage 172. The mid supply passage 172 is further in fluid communication with the near wall cooling mesh 176 through the inlet 184. The cooling airflow from the inlet 184 can move through the near wall cooling mesh 176, traveling from the inlet 184 and through the channel 178, which can include one or more pins or pin banks 180, to the mesh plenum 182 where the cooling fluid can be exhausted through the film holes 200 to create a cooling film along the external surface of the airfoil 78.

The mid cooling circuit 122 can further comprise a lower turn 216, providing cooling fluid to the mid return passage 174 from the mid supply passage 172. From the mid return passage 174, the film holes 200 can exhaust the cooling fluid from the mid cooling passage 122 to provide a cooling film along the exterior surface of the airfoil 78. The mid return passage 174 extends between the suction and pressure sidewalls 98, 100, such that sets of film holes 200 can provide a cooling fluid flow to the exterior surfaces of the airfoil 78.

It should be appreciated that cooling circuits 120, 122, 124, as illustrated in FIG. 6 are exemplary of one implementation of the cooling circuits within an airfoil 78 and should not be construed as limited by the particular geometry, passages, pin banks, film holes, etc. It should be further understood that while the cooling circuits 120, 122, 124, 124*a*, 124*b* are illustrated as generally moving from the leading edge 102 toward the trailing edge 104 or the trailing edge 104 toward the leading edge 102, the illustration is only an exemplary depiction of the cooling circuits themselves. The particular passages, channels, inlets, or mesh can flow in any direction relative to the airfoil 78, such as in the trailing or leading edge 102, 104 direction, tip 80 or root 82 direction, or toward the pressure 98 or suction 100 sidewalls of the airfoil 78, or any combination thereof.

Figure 7:
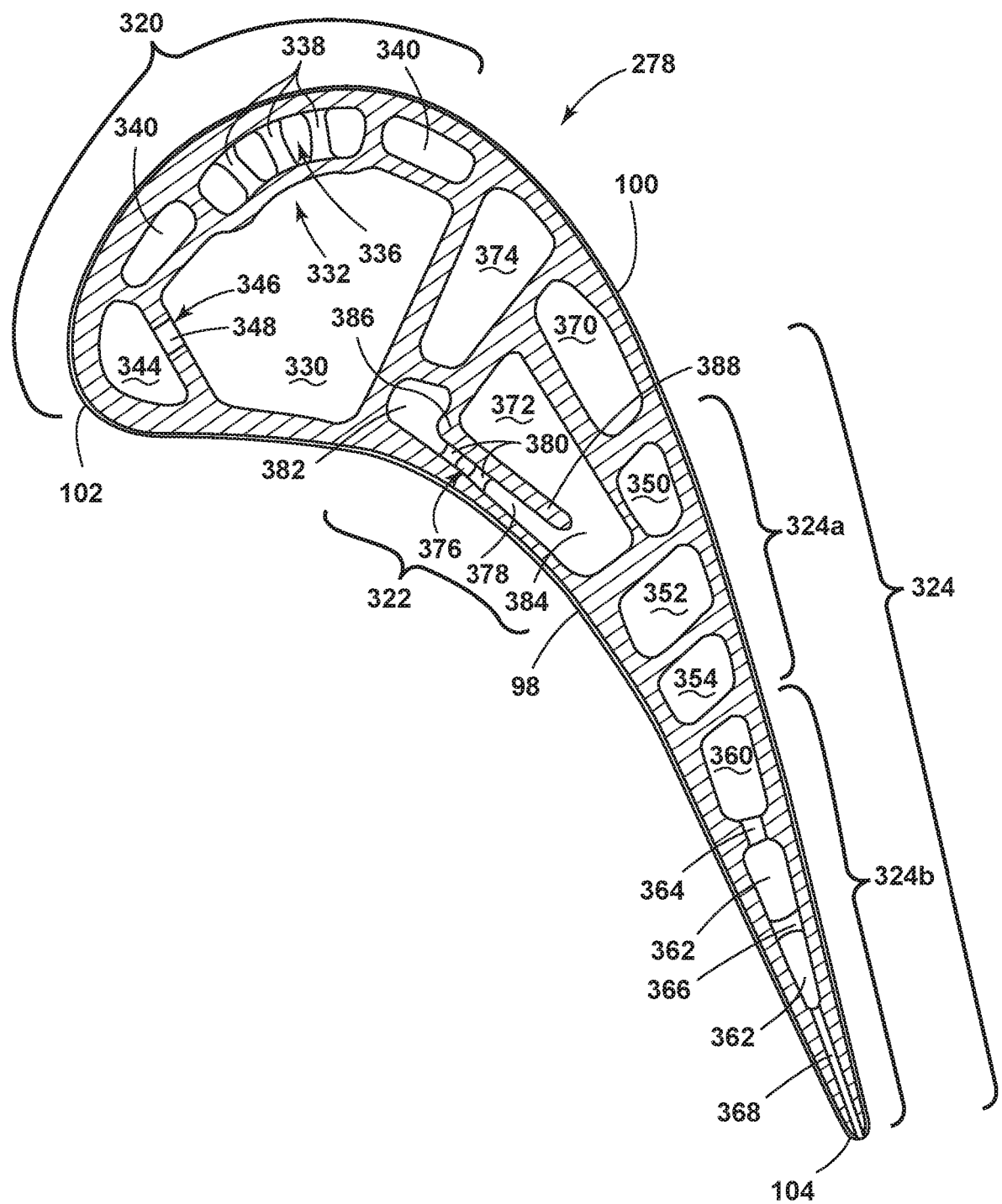
FIG. 7 is a diagram of the cross-sectional airfoil of FIG. 3 illustrating a near wall cooling mesh and plenum being fed in the opposite direction than that of FIG. 4.

FIG. 7 illustrates a cross-section of an airfoil 278 where a near wall cooling mesh 376 within a mid cooling circuit 322 extends in chord-wise direction being substantially of the trailing edge 104 toward the leading edge 102. The airfoil 278 of FIG. 7 can be substantially similar the airfoil 78 of FIG. 4. As such, similar elements will be identified with similar numerals increased by a value of two-hundred.

The mid cooling circuit 322 is fed from the second inlet passage 90, being in fluid communication with an upstream supply passage 370. The upstream supply passage 370, extending in a root 82 to tip 80 direction, is in fluid communication with a mid supply passage 372. The mid supply passage 372 extends from tip 80 to root 82, and is in further fluid communication with the near wall cooling mesh 376 and the mid return passage 374. The mid return passage 374 receives a cooling fluid form the mid supply passage 372 near the root 82, and extends from root 82 to tip 80. Film holes can extend from the external surface of the airfoil 78 to the mid return passage 374, providing the cooling fluid to the external surface of the airfoil 278 to form a cooling film.

The near wall cooling mesh 376 comprises a channel 378, being fed from the mid supply passage 372 through a radially extending opening defining a fluid inlet 384. The channel 378 in FIG. 7, in contrast to the channel 178 of FIG. 4, extends in a trailing edge 104 to leading edge 102 chord-wise direction. A plurality of pins or pin banks 380 can be disposed within the channel 378. A mesh plenum 382 is in fluid communication with the mid supply passage 372 via the channel 378 and is disposed chord-wise-opposite of the inlet 384 relative to the channel 378. A dividing wall 388 further defines and is disposed between the mid supply passage 372 and the channel 378. The dividing wall 388 comprises a free end 388 adjacent to the inlet 384.

The mesh plenum 382 can be disposed adjacent to the mid return passage 374, such that the mesh plenum 382 is situated between the mid return passage 374 and the pressure sidewall 98. A plurality of film holes can extend into the mesh plenum 382, providing the cooling fluid to the external surface of the airfoil 278 to form a cooling film. It should be appreciated that while the near wall cooling mesh 376 is illustrated as adjacent to the pressure sidewall 98, it can alternatively be disposed adjacent to the suction sidewall 100.

The mesh plenum 382 comprises a cross-sectional area being larger relative to the channel 378, facilitating machining of the film holes extending between the external surface of the airfoil and the mesh plenum 382. Typical drilling of film holes through the sidewalls 98, 100, can extend into and damage interior walls or passages if not provided with sufficient space for the drill to extend. The additional volume within the mesh plenum 382 further provides a kinder airflow within the mesh plenum 382, which can assist in establishing a uniform cooling film exhausted form the film holes.

It should be appreciated that the geometry as illustrated in FIG. 7 can be exemplary of one implementation of the mid cooling circuit 322, and that particular geometries of the passages, wall, channels, pin banks, etc., can vary from the airfoil 278 as shown. For example, the cross-sectional area of the combination of the mid supply passage 372 and the near wall cooling mesh 376 can be smaller or disposed closer to the trailing edge 104, such that the mid return passage 374 spans the interior between the pressure sidewall 98 and the suction sidewall 100.

It should be further appreciated that mid cooling circuits 122, 322 as illustrated in FIGS. 4, 5 and 7 are exemplary implementations of the cooling circuits comprising a near wall cooling mesh 176, 376 and a mesh plenum 182, 382 within an airfoil 78, 278 and should not be construed as limited by the orientation of the passages, pin banks, film holes, etc. It should be further understood that while the cooling circuits 120, 122, 124, 124a, 124b are illustrated as generally moving from the leading edge 102 toward the trailing edge 104 or the trailing edge 104 toward the leading edge 102, the illustration is only an exemplary depiction of the cooling circuits themselves. The particular passages, channels, inlets, or mesh can flow in any direction relative to the airfoil 78, such as in the trailing or leading edge 102, 104 direction, tip 80 or root 82 direction, or toward the pressure or suction sidewalls 98, 100 of the airfoil 78, or any combination thereof.

The various embodiments of systems, methods, and other devices disclosed herein provide improved cooling effectiveness for the cooling circuit of a turbine blade. One advantage that may be realized in the practice of some embodiments of the described systems is that the near wall cooling mesh of the blade can be utilized with at least one of pressure or suction sidewalls of the blade, or with both sidewalls, while providing air to the film holes in order to create a cooling film on the external surface of the airfoil. The implemented near wall cooling mesh provides optimal cooling and airflow management within an airfoil, and provides space for the machining of film holes within the near wall cooling mesh. While the specific embodiments are described in terms of an airfoil in the form of a turbine blade, the description is equally applicable to any airfoil within the gas turbine engine, including, without limitation, turbine vanes, compressor blades and compressor vanes.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a gas turbine engine, the airfoil comprising:
    an outer surface defining a pressure side and a suction side extending axially between a leading edge and a trailing edge and extending radially between a root and a tip; and
    a cooling circuit located within the airfoil and comprising:
        a cooling air inlet passage;
        a radially extending supply passage;
        an upstream supply passage fluidly coupling the cooling air inlet passage and the supply passage;
        a near wall cooling mesh located adjacent to and extending along a portion of the outer surface; and
        a radially extending opening fluidly coupling the supply passage to the near wall cooling mesh to define a fluid inlet for the near wall cooling mesh;

wherein cooling air flows in a first direction through the upstream supply passage and in a second direction through the supply passage, with the second direction being a tip-to-root direction, and wherein the cooling air flows through the near wall cooling mesh via the fluid inlet.

2. The airfoil according to claim 1 further comprising a pin bank located within the near wall cooling mesh.

3. The airfoil according to claim 1 wherein the near wall cooling mesh is located adjacent to one of the pressure side and the suction side.

4. The airfoil according to claim 1 further comprising a radially extending dividing wall located within an interior of the airfoil and extending along the outer surface to partially define the supply passage and the near wall cooling mesh.

5. The airfoil according to claim 4 wherein the dividing wall terminates in a free end partially defining the fluid inlet for the near wall cooling mesh.

6. The airfoil according to claim 5 further comprising a structural rib located within the interior and extending between the pressure side and the suction side, with the structural rib partially defining the supply passage and spaced from the free end to define the fluid inlet in combination with the free end.

7. The airfoil according to claim 1, further comprising a plenum fluidly coupled to the near wall cooling mesh to define a fluid outlet for the near wall cooling mesh.

8. The airfoil according to claim 7 wherein one of the fluid inlet and the fluid outlet for the near wall cooling mesh is located closer to the leading edge than the other of the fluid inlet and the fluid outlet for the near wall cooling mesh.

9. The airfoil according to claim 7 wherein a maximum cross-sectional area of the plenum is greater than a maximum cross-sectional dimension of the near wall cooling mesh.

10. The airfoil according to claim 7 further comprising a film hole extending through the outer surface and into the plenum.

11. The airfoil according to claim 7 wherein the near wall cooling mesh is arranged such that the cooling air flowing through near wall cooling mesh from the fluid inlet to the fluid outlet flows in a direction from the leading edge toward the trailing edge.

12. The airfoil according to claim 7 wherein at least a portion of the plenum extends along the outer surface.

13. The airfoil according to claim 7 wherein a cross-sectional area of the plenum is greater than a cross-sectional area of the near wall cooling mesh in an airflow direction.

14. A blade for a gas turbine engine having a turbine rotor disk, the blade comprising:
a dovetail having multiple air inlet passages and configured to mount to the turbine rotor disk;
an airfoil extending radially from the dovetail and having an outer surface defining a pressure side and a suction side extending axially between a leading edge and a trailing edge and extending radially between a root and a tip, with the root being adjacent the dovetail;
a leading edge cooling circuit located within the airfoil and fluidly coupled to a first air inlet passage of the multiple air inlet passages;
a trailing edge cooling circuit located within the airfoil and fluidly coupled to a second air inlet passage of the multiple air inlet passages; and
a mid cooling circuit located within the airfoil and between the leading edge cooling circuit and the trailing edge cooling circuit, the mid cooling circuit comprising:
a radially extending supply passage;
an upstream supply passage fluidly coupling a third air inlet passage of the multiple air inlet passages to the supply passage;
a near wall cooling mesh located adjacent to and extending along a portion of the outer surface; and
a radially extending opening fluidly coupling the supply passage to the near wall cooling mesh to define a fluid inlet for the near wall cooling mesh;
wherein cooling air flows in a first direction through the upstream supply passage and in a second direction through the supply passage, with the second direction being a tip-to-root direction, and wherein the cooling air flows through the near wall cooling mesh via the fluid inlet.

15. The blade according to claim 14 further comprising a radially extending dividing wall located within an interior of the airfoil and extending along the outer surface to partially define the supply passage and the near wall cooling mesh.

16. The blade according to claim 15 wherein the dividing wall terminates in a free end partially defining the fluid inlet for the near wall cooling mesh.

17. The blade according to claim 16 further comprising a structural rib located within the interior and extending between the pressure side and the suction side, with the structural rib partially defining the supply passage and spaced from the free end to define the fluid inlet in combination with the free end.

18. The blade according to claim 14, further comprising a plenum fluidly coupled to the near wall cooling mesh to define a fluid outlet for the near wall cooling mesh, wherein a cross-sectional area of the plenum is greater than a cross-sectional area of the near wall cooling mesh in an airflow direction.

19. The blade according to claim 18 wherein one of the fluid inlet and the fluid outlet for the near wall cooling mesh is located closer to the leading edge than the other of the fluid inlet and the fluid outlet for the near wall cooling mesh.

20. An airfoil for a gas turbine engine having a peripheral wall bounding an interior and defining a pressure side and a suction side, opposite the pressure side, a near wall cooling mesh located adjacent to and extending along a portion of one of the suction side and pressure side, a supply passage, a cooling air inlet passage, and an upstream supply passage fluidly coupling the cooling air inlet passage and the supply passage, wherein cooling air flows in a first direction through the upstream supply passage and a second direction through the supply passage, with the second direction being a tip-to-root direction, and wherein the cooling air flows through the near wall cooling mesh via the cooling air inlet passage.

* * * * *